INVENTORS
ALLEN C. ODIAN
FATIN BULOS
FRANCESCO VILLA
DAVID E. YOUNT
ATTORNEY

INVENTORS
ALLEN C. ODIAN
FATIN BULOS
FRANCESCO VILLA
DAVID E. YOUNT

BY
ATTORNEY

INVENTORS
ALLEN C. ODIAN
FATIN BOLUS
FRANCESCA VILLA
DAVID E. YOUNT

BY
ATTORNEY

INVENTORS
ALLEN C. ODIAN
FATIN BULOS
FRANCESCO VILLA
DAVID E. YOUNT
BY
ATTORNEY

INVENTORS
ALLEN C. ODIAN
FATIN BULOS
FRANCESCO VILLA
DAVID E. YOUNT

BY
ATTORNEY

United States Patent Office 3,445,661
Patented May 20, 1969

3,445,661
PULSE-SHAPING TRANSMISSION-LINE TRANS-FORMER FOR A DOUBLE-GAP STREAMER CHAMBER
Allen C. Odian and Fatin Bulos, Palo Alto, Francesco Villa, Los Altos, and David E. Yount, Menlo Park, Calif., assignors to the United States of America as represented by the United States Atomic Energy Commission
Filed Sept. 11, 1967, Ser. No. 667,338
Int. Cl. G01t *1/18;* H01j *39/26*
U.S. Cl. 250—83.3                10 Claims

ABSTRACT OF THE DISCLOSURE

A large streamer chamber has all parts equally energized with a high-voltage pulse that has a duration on the order of the chamber length. The chamber is directly energized as a transmission line from a five-element transmission-line transformer matched to the characteristic impedance of the chamber. The transformer is charged from a Marx generator through a spark-gap switch. The chamber is terminated with a resistance equal to the characteristic impedance of the chamber.

Background of the invention

The present invention relates generally to a system for energizing a streamer chamber, and more particularly, it pertains to a system for energizing a large streamer chamber with a very high voltage, short duration pulse applied with equal amplitude to all parts of the chamber.

The invention disclosed herein was made under, or in, the course of Contract No. AT(04-3)-400 with the United States Atomic Energy Commission.

For some high-energy particle physics experiments, streamer chambers have certain advantages over other known elementary particles track detectors. In a streamer chamber, the accuracy of track location and momentum measurement is excellent. Also, the multiple track efficiency is high and there is no "robbing" action between closely spaced streamers. This permits substantially all of the streamers to develop. Another advantage is that the track vertices in a streamer chamber, as well as other event details, are all shown clearly and may be viewed from all sides of the chamber. Still another advantage is that a streamer chamber system may be easily arranged to be selectively triggered by only those events that are of interest. Bubble chambers, for example, show as good detail as a streamer chamber, but have the disadvantage of being very slow in operation. Bubble chambers, therefore, cannot be triggered by only those events of interest, and pictures must be taken at random over a long period. In a typical experiment in which a bubble chamber is utilized, as many as 1 million pictures may be taken, from which only 10,000 pictures of pertinent events may be collected. It therefore becomes very expensive to expose, develop, process and analyze the large quantity of photographic film involved in an experiment utilizing a bubble chamber. Also, the time taken to run an experiment to obtain a sufficient number of interesting events is an added expense. In order to conserve photographic film processing, film analysis time and experiment time, it is known to arrange a spark chamber to be triggered upon occurrence of desired events. However, spark chambers have the disadvantage of producing pictures that are poor in details of various kinds, and are therefore not suitable for many types of physics experiments. Streamer chambers, therefore, because of the advantages previously mentioned and their ability to be triggered by only those events of interest, are very advantageous for use as particle track detectors for many types of physics experiments.

Some requirements for successful operation of a large streamer chamber are that it be energized with a very high voltage pulse (typically in the megavolt range) of short duration (typically, 10 nsec.), and that the pulse be applied to all parts of the chamber with the same shape and amplitude. When a streamer chamber is used in conjunction with a high-energy particle accelerator, another requirement is that there be sufficient space in the chamber for full developent of an event. Thus, as the size of a streamer chamber is increased, for example, to a length of 2 meters, the chamber length is on the order of the pulse duration. It becomes a problem, therefore, to prevent pulse deflections which cause unequal voltages in various parts of the chamber. Such unequal voltages would produce streamers of unequal length and brightness. Known high-voltage generators, for example, Marx generators, are available for producing pulses of sufficiently high voltage. Such generators, however, produce pulses that have rise times, duration times, and fall times that are much too long for successful operation of a streamer chamber. Application of a long pulse to a streamer chamber causes streamers developed therein to further develop into spark tracks and the chamber to operate as a spark chamber with the inherent disadvantages thereof.

Summary of the invention

In the present invention, energy is applied to a large double-gap streamer chamber from a high-voltage pulse source by means of a pulse-shaping five-element transmission-line transformer. The transformer is comprised of two sections, one section for supplying an energizing pulse to each gap of the streamer chamber. Each side of the transformer is comprised of three elements, one element being common to each side to result in a five-element transformer. The elements of the transformer are charged by relatively long high-voltage pulses applied thereto from the high-voltage pulse source. When the transformer becomes fully charged, a spark-gap switch is closed, causing the energy in the transformer to propagate as a pulse from each side of the transformer to respective wide gaps of the streamer chamber. Each gap of the streamer chamber is terminated with an impedance equal to the characteristic impedance of the respective chamber gaps to prevent reflection of the pulse. Furthermore, the impedance of each side of the transformer is matched to the characteristic impedance of respective chamber gaps. The shaped pulses from the transformer have very fast rise times, are of short duration, and have fast fall times. Since the impedance of each side of the transformer and each side of the streamer chamber is constant throughout the length of the transformer and chamber, pulses of the same shape and amplitude are applied equally to all parts of each side of the chamber, thereby resulting in a constant streamer brightness. Finally, by using a double-gap chamber, a chamber is obtained having a good depth; yet the highest voltage required is one-half that required for a single-gap chamber of equal depth.

It is an object of the invention to apply a very high voltage, short duration pulse equally to all parts of a large streamer chamber.

Another object is to transduce relatively long high voltage pulses to high-voltage pulses of short duration having fast rise and fall times.

Another object is to energize a large double-gap streamer chamber beginning with a conventional high-voltage pulse source.

Other objects and advantageous features of the invention will be apparent in a description of a specific embodiment thereof, given by way of example only, to enable one skilled in the art to readily practice the invention, and described hereinafter with reference to the accompanying drawing.

Description of an embodiment

Figure 1:
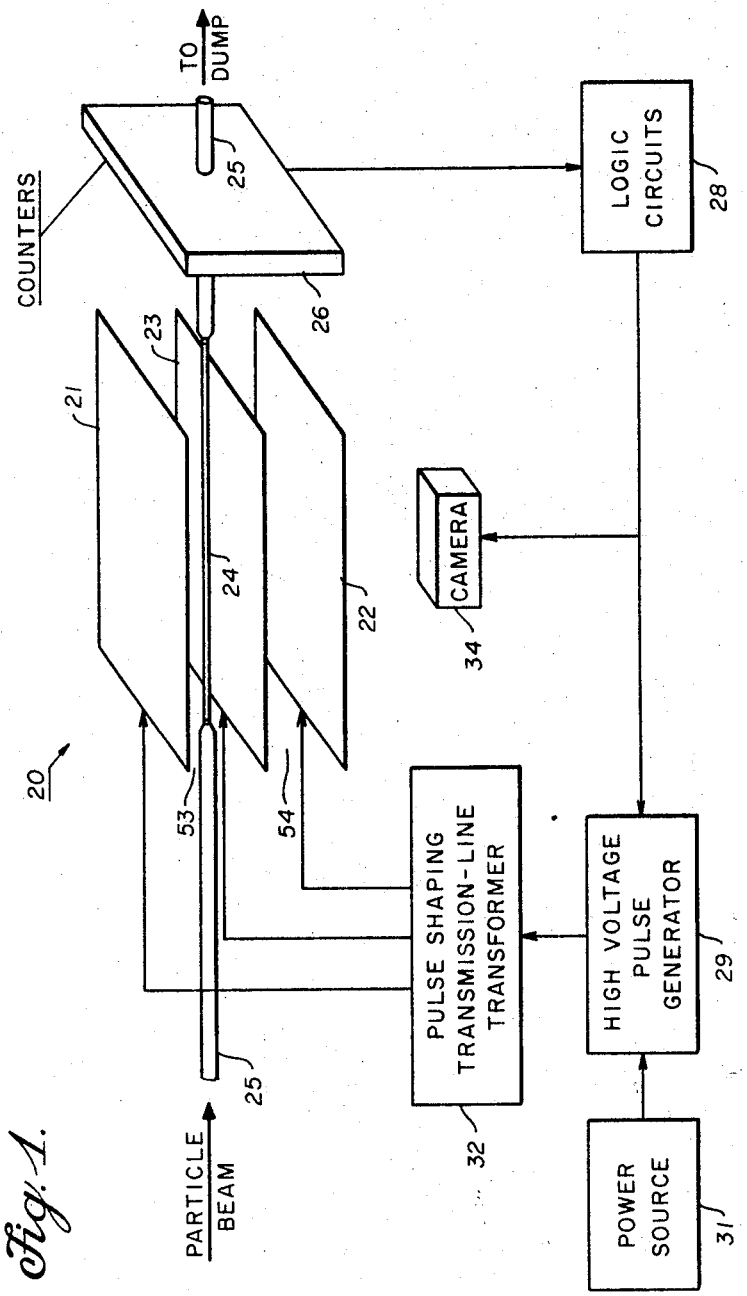
FIGURE 1 is a block diagram of a system for supplying very fast, high-voltage pulses to a large double-gap streamer chamber, according to the invention.

One general system in which the invention may be utilized is shown in block diagram in FIGURE 1, and includes a wide double-gap streamer chamber 20 having outer plates 21 and 22, and a common plate 23 forming gaps 53 and 54 with each of the outer plates. A target 24, which for example may be a tube made of polyethylene terephthalate filled with hydrogen gas and sealed at each end, is mounted near the common plate 23. Each end of the target 24 connects with a beam pipe 25, through which a high-energy particle beam is directed to the target. At the downstream end of the target, a plurality of counters 26 may be mounted for detecting the occurrence of events. The portion of the particle beam which does not enter into a nuclear interaction is directed through a downstream portion of the beam pipe 25 to a beam dump. The output of the counters is applied to logic circuits 28. The counters and logic circuits may be arranged to respond only to events of interest. Upon the occurrence of a desired event, a signal is applied from the logic circuits 28 to a high-voltage pulse generator 29 which is maintained in a charged condition by a power source 31. The high-voltage pulse generator 29 may, for example, be a Marx generator which will respond to the logic circuits' signal to discharge a high-voltage pulse into a pulse-shaping transmission-line transformer 32. The transformer 32 transduces the relatively long high-voltage pulse from the generator 29 to a pair of very fast high-voltage pulses. One pulse is applied between the common plate 23 and the outer plate 21, while the other pulse is applied between the common plate 23 and the outer plate 22. The peak amplitude of each of the pulses applied to the streamer chamber is made equal to the peak amplitude of the pulse from the generator 29. The high-voltage pulse applied across the plates is used to cause visible radiation along the paths of the particles resulting from a detected event. This is accomplished by filling the space between the plates 21, 22 and 23 with an ionizable gas such as a mixture of 90% neon and 10% helium. As the particles from an event pass through the gas, the gas atoms along the paths are ionized. Since a high-voltage pulse is applied to the streamer chamber immediately following creation of the ionized paths, an electric field is created which accelerates the ionized particles toward the plates of the chamber. This acceleration causes an avalanche of ionized particles which leads to photoionization of the particles. Since photoionization produces visible radiation, the paths of the particles may be photographed for later study and analysis.

In order to obtain pictures of the ionized paths, the plates 21, 22 and 23 may be made transparent by constructing a portion of them of very fine wires that are closely and evenly spaced. Application of the fast high-voltage pulse to the plates results in a uniform electric field for accelerating the ionized gas atoms. A camera 34 may be selectively operated by the same pulse which triggers the generator 29 to photograph the ionized track of each nuclear event of interest. The short duration of the pulse applied to the streamer chamber prevents the photoionization from developing into a spark discharge between the plates. The detail of the ionized tracks is thereby preserved to obtain excellent pictures of selected events.

Figure 2:
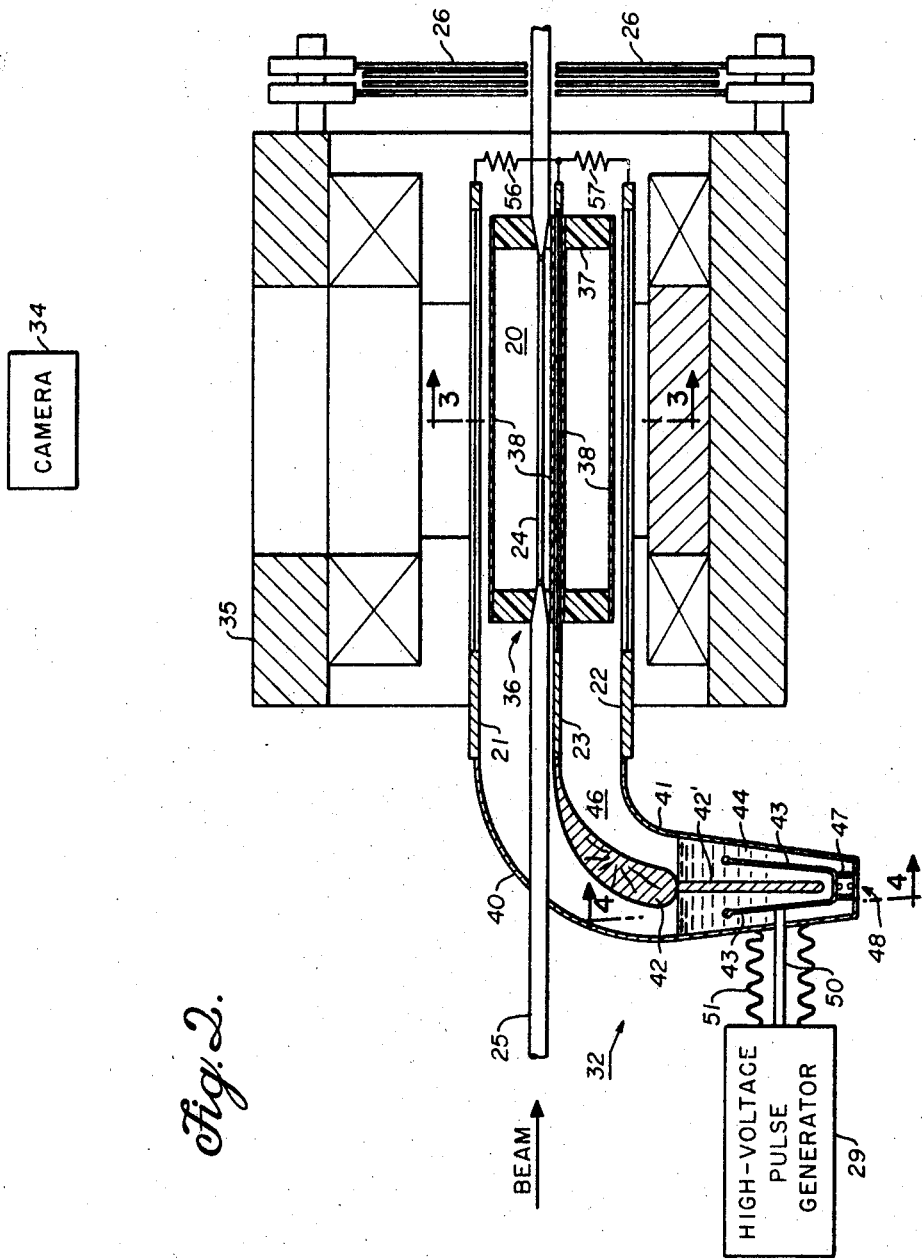
FIGURE 2 is a cross-sectional view of a pulse-shaping transmission-line transformer, a streamer chamber and a large electromagnet, with the streamer chamber mounted in the area of the central field of the electromagnet.

The streamer chamber 20 and the pulse-shaping transmission line transformer 32 are shown in cross-section in FIGURE 2. The streamer chamber 20 is shown symmetrically mounted with the plates 21, 22 and 23 perpendicular to the central field of a large electromagnet 35 to cause the particles resulting from an event to curve according to their reespective masses and velocities.

In order to contain ionizable gas within the gaps 53 and 54, two cells 36 are mounted between the gaps. The cells 36 are comprised of walls 37 made of structurally strong electrical insulation. The walls 37 may conveniently be constructed in an oval shape (not illustrated). The upper and lower side of each cell is enclosed with a transparent sheet 38 of electrical insulation. The thin wire electrodes and transparent sheets permit photography of streamers developed within the cell. Polyethylene terephthalate has been found to be a suitable material for the transparent sheets, while it has been found advantageous to construct the cell walls 37 of polyurethane foam. The interior of each cell 36 is filled with an ionizable gas, while the outer portion of the chamber is exposed to atmosphere. In this arrangement, the polyurethane foam walls have been found to be advantageous since the dielectric constant of polyurethane foam is nearly the same as air. This prevents a build-up of electric field concentrations near the surface of the foam when it is subjected to the high electric field of the high-voltage pulses applied to the chamber. Such concentrations lead to surface breakdown of the walls 37.

Figure 3:
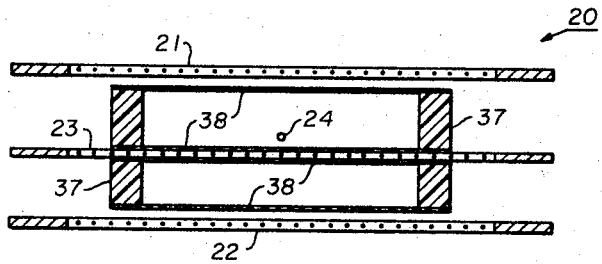
FIGURE 3 is a cross-sectional view of a complete section of the streamer chamber of FIGURE 2, taken along lines 3—3.
Figure 4:
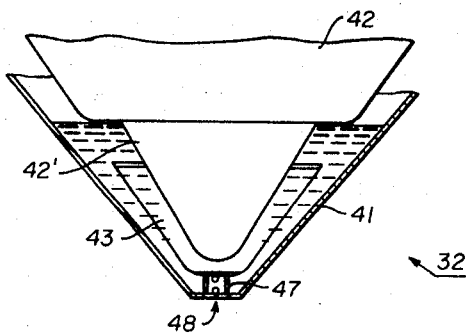
FIGURE 4 is a cross-sectional view of a complete section of the pulse-shaping transmission-line transformer of FIGURE 2, taken along lines 4—4.

In FIGURE 3 is shown a complete cross section of the chamber 20, taken along lines 3—3 of FIGURE 2. The plates 21, 22 and 23 are each made of solid metal plate with a large opening opposite the cell 36. The thin metal wires are stretched across each opening and are electrically connected to the solid portion of the plates. Each of the plates is connected to a respective output from the transformer 32 which includes a pair of electrodes 40 and 41. The electrodes 40 and 41 also are metal plates, each having a width that tapers toward the lower end. The plate 23 is connected to a center electrode 42 of the transformer 32. The electrode 42 may conveniently be constructed of aluminum or wood, covered with a copper sheet, in a curved tear-drop shape, which is then connected to the central plate 23. The lower end of the electrode 42 is electrically connected to an etxension 42'. An intermediate charging electrode 43 is symmetrically mounted around the center electrode 42'. A spark-gap switch 48 is provided between the electrode 43 and the electrodes 40 and 41. The lower portion of the transformer 32 is filled with oil to a level that coincides with the connection between common electrode 42 and the extension 42'. The oil provides an effective dielectric to permit slow charging of the electrodes to a high voltage. An insulating spacer 47 encloses the spark gap to seal it from the oil. A gas may be continuously circulated in this enclosed space and its pressure varied for control of the breakdown of the spark gap switch 48. The high-voltage pulse generator 29 (FIGURE 2) is connected to the electrode 43 by means of an inductance 50 and to the electrodes 40 and 41 through a metallic bellows 51 which encloses the inductance and contains oil to prevent conduction between the electrode 50 and bellows 51.

The transformer proper is comprised of a charging section 44 that is connected to the streamer chamber by means of a transmission line 46. The charging section 44 includes the spark gap switch 48, the charging electrode 43, and adjacent portions of electrodes 40, 41 and 42'. The transmission line includes the portions of the electrodes 40, 41 and 42 that extend toward the chamber 20 from an interface, with the charging section at the upper ends of the electrode 43.

Figure 5:
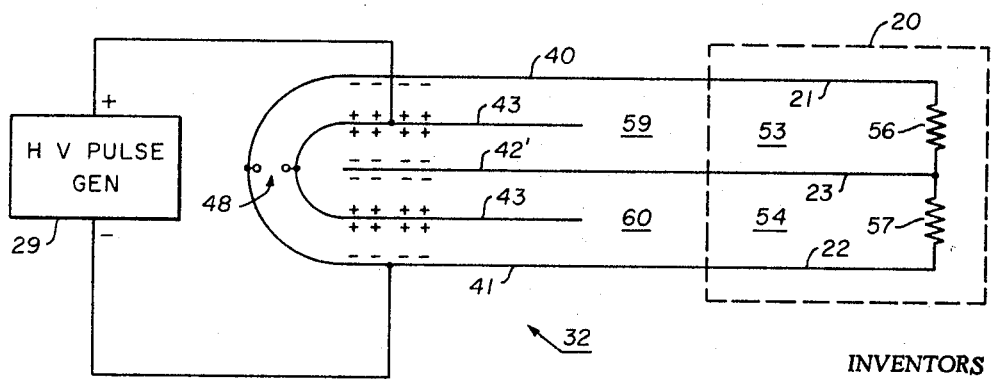
FIGURE 5 is a schematic diagram of the high-voltage pulse generator, the pulse-shaping transmission-line transformer, and the streamer chamber of FIGURE 2.

The transformer 32 and streamer chamber 20 may be represented schematically, as shown in FIGURE 5. The right ends of the gaps 53 and 54 are terminated respectively with impedances 56 and 57 which are each equal to the characteristic impedance of the respective gaps. The transformer 32 is comprised of symmetrical halves 59 and 60 which supply energy to respective gaps 53 and 54. Each of these halves is constructed to have a characteristic impedance at the interface between the charging section 44 and the transmission line 46, equal to the impedance of respective gaps 53 and 54.

During charging of the transformer 32, the electrodes 40, 41, 42' and 43 may be considered as plates of capacitors. During the discharge of a pulse from the transformer 32 to the chamber 20, the electrodes of the transformer, as well as those of the chamber 20, are considered as transmission lines.

Power is applied continuously from the power source 31 (FIGURE 1) to the high-voltage pulse generator 29. Upon receiving a triggering signal from the logic circuits 28, a relatively long high-voltage charging pulse 67 (FIGURE 9) is applied to the outer electrodes 40 and 41, and to the central electrode 43. With the generator 29 poled as indicated in FIGURE 5, the surfaces of the electrodes become charged as indicated by the signs in the figure, the electrode 42' becoming charged by means of the path through the impedances 56 and 57. Thus, there is zero voltage across the electrodes 41 and 42', as well as across the gap 54 during the charging pulse.

Figure 6:
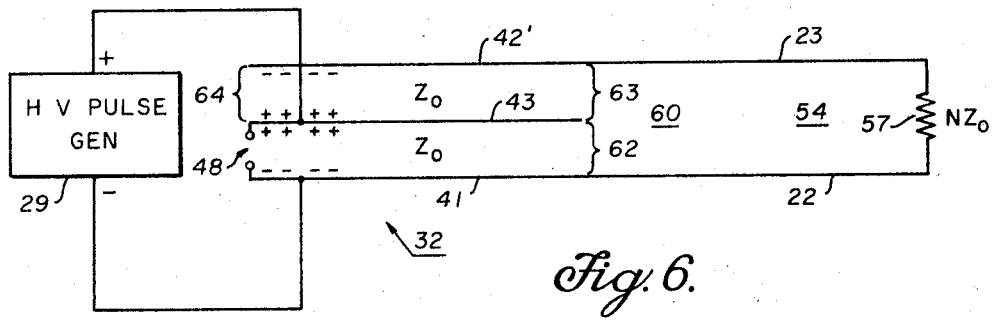
FIGURE 6 is a schematic diagram of one-half of the pulse-shaping transmission-line transformer and streamer chamber of FIGURE 5, illustrated for purposes of analysis.

For purposes of analysis, it is convenient to consider only one-half of the system shown in FIGURE 5, since each half acts in the same way to produce an equal pulse at its respective gap. In FIGURE 6 is shown one-half of tht system of FIGURE 5. Each half of the transformer 32 constitutes a stacked transmission line. The half shown in FIGURE 6 includes open ends 62, 63 and 64 and the spark gap switch 48. When the electrodes 40, 41 and 42' are charged to a predetermined voltage level, a spark discharge is initiated across the gap of the switch 48. This causes an interchange between the charges on the lower surface of the electrode 43 and the opposing upper surface of the electrode 41. A fast pulse 61 is propagated thereby from the switch 48 toward the open end 62, the delay of the pulse being equal to the length of the electrode 43 divided by the velocity of light. Since there is an interchange of charges at the switch 48, the fast pulse has a polarity that is opposite to the polarity between the electrodes 41 and 43 as charged by the high-voltage pulse generator 29. Upon appearance of the fast pulse at the end 62, the voltage of the pulse adds to the voltage between the electrodes 42' and 43, to make the voltage between the electrodes 41 and 42' equal to the peak charging voltage from the generator 29. If the peak voltage from the generator 29 is $V_0$, the voltage across the open ends 62 and 63 also is $V_0$, and a resulting pulse 61 occurs across the load. Since the characteristic impedance of any transverse cross section through the gap 54 or transformer 60 is constant and equal to the terminating impedance 57, the impedance facing the open ends 62 and 63 is the characteristic impedance of a transformer half or the terminating impedance. For purposes of analysis, it is convenient to redraw the schematic of FIGURE 6 as the schematic shown in FIGURE 7. Upon occurrence of the fast pulse at the open ends 62 and 63, the impedances to be dealt with are those between the electrodes 41 and 43, and 42' and 43. Each of these impedances may be designated as $Z_0$, while the load impedance may be designated as $NZ_0$.

Figure 7:
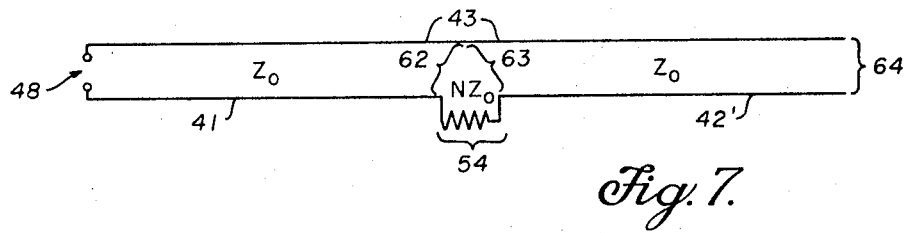
FIGURE 7 is a diagram of portions of FIGURE 6, rearranged for purposes of analysis.

It will be noted from FIGURE 7 that the impedance $Z_0$ between electrodes 42' and 43 is in series with the load impedance $NZ_0$; thus, the sum of the peak voltages of the pulse portions transmitted from the ends 62 and 63 toward the open end 64 and terminating impedance 57 is $$V_T = 2V_0(NZ_0+Z_0)/(Z_0+NZ_0+Z_0) \quad (1)$$
$$= 2V_0[N/(N+2)+1/(N+2)]$$

The voltage $V_T$ may be divided into components transmitted toward the end 64 and toward the load; the load is considered as any cross section of one-half of the system from the interface between section 44 and transmission line 46 toward the terminating impedance:

Peak voltage toward the load, $$V_L = 2V_0N/(N+2) \quad (2)$$

Peak voltage toward the end 64, $$V_{64} = 2V_0/(N+2) \quad (3)$$

By matching the impedance of the load to the impedance of the section 60, there will be not reflected pulses, and maximum power transfer will be obtained. Since the impedance of the section 60 is simply the total of the impedance $Z_0$ between the electrodes 41 and 43, and 43 and 42, the total is $Z_0+Z_0=2Z_0$. The load impedance, i.e., the characteristic impedance of gap 54, is made $2Z_0$. By substituting $N=2$ in Equation 2, the voltage of the pulse propagated toward the load becomes $V_0$.

Figure 8:
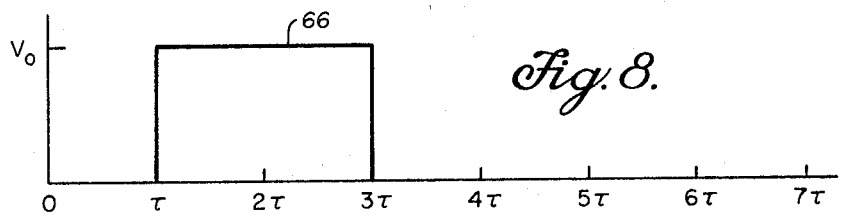
FIGURE 8 is a pulse timing diagram showing the duration of a pulse applied to the streamer chamber gap of FIGURE 6.

The duration of the pulse transmitted to the load and the elimination of reflected pulses may be explained with reference to FIGURE 8. At time zero, the switch 48 is closed. A fast pulse is developed thereby at the switch 48 and propagated toward the end 62. As mentioned before, the time period for the fast pulse to propagate from the switch to the load is equal to the length of the electrode 43 from the switch to one end, divided by the velocity of light. This time period may be referred to as $\tau$.

Thus, at time $\tau$, the fast pulse reaches the end 62 and causes, as discussed hereinbefore, propagation of a pulse (not illustrated) toward the end 64, a pulse 66 (FIGURE 8) toward the load, and a reflected pulse (not illustrated) toward the switch 48.

The pulse propagating toward the open end 64 transverses the electrode 43 and reaches the open end 64 during another time period $\tau$. Upon reaching the open end 64, this pulse, there being no way for it to dissipate, is reflected without a change of polarity toward the open end 63, reaching the end 63 during another time period $\tau$; the total time for the propagation of the pulse from the end 63 to the end 64 and back to the end 63 is $2\tau$. During the same time period, the pulse from the switch 48 is reflected from the end 62 toward the switch 48, and reaches the switch in a time period $\tau$. Since the switch is maintained closed by the pulse generator voltage across the electrodes 41 and 43, the pulse finds a shorted end, causing it to reverse in polarity and reflect back to the open end 62. The total time for propagation of the pulse from the end 62 to the switch 48 and back to the end 62 is also $2\tau$. The reflected pulses therefore arrive simultaneously at the ends 62 and 63; however, they are opposite in polarity due to the phase reversal of the pulse at the switch 48. Since the reflected pulses occur simultaneously, but in phase opposition, across the ends 62 and 63, the total voltage at time $3\tau$ is zero across the electrodes 41 and 42' and across the load. Thus, the pulse 66 is applied to the load element one time period $\tau$ after closure of the switch 48; the pulse has a duration of two time periods; and it is sharply cut off at the end of three time periods. Proper matching of the load to the transformer 32 causes all successive pulses reflected from the open ends 62, 63 and 64 and switch 48 to be zero. There can be no "after" pulse from the generator 29 since its output is continuously shorted by the switch 48. Thus a single very fast pulse 66 is obtained which has a very short rise time caused by the spark-gap switch 48, a duration precisely controlled by the length of the electrode 43, and a sharp fall time caused by the simultaneous arrival of reflected pulses at the ends 62 and 63. Furthermore, the described arrangement has substantially 100% voltage efficiency, i.e., the voltage $V_0$ across the load is substantially equal to the voltage $V_0$ from the generator 29. Another advantage is that the pulse 66 has a very rectangular shape that can be easily transmitted to the streamer chamber with complete impedance matching throughout the system.

Figure 9:
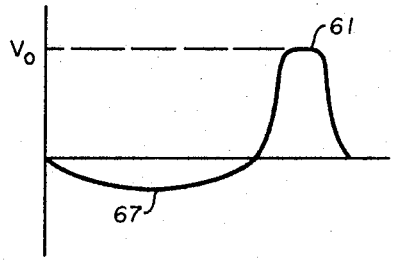
FIGURE 9 is a waveform diagram of a charging pulse applied to the transformer of FIGURE 6 and of a pulse generated upon closure of a spark-gap switch.
Figure 10:
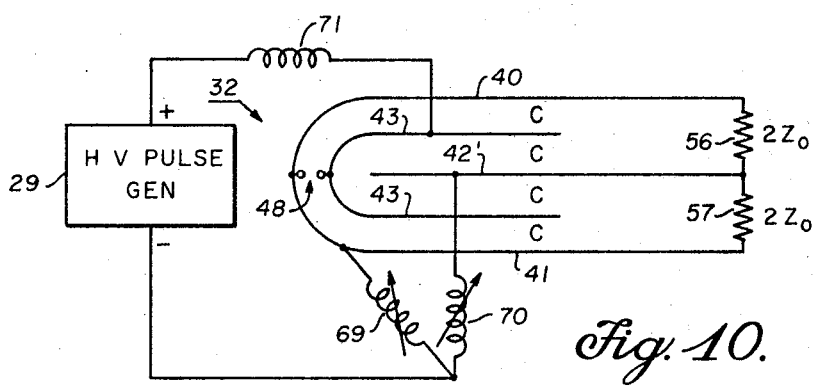
FIGURE 10 is a schematic diagram of a transformer charging circuit for eliminating application of the charging pulse to the streamer chamber.
Figure 11:
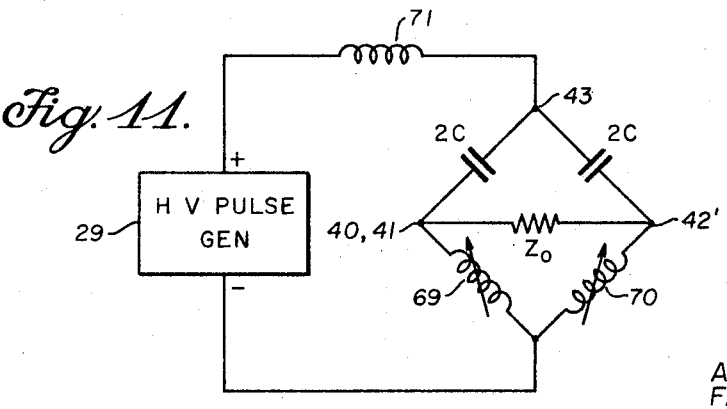
FIGURE 11 is a schematic diagram of the charging circuit of FIGURE 10 with the circuit constants lumped together to illustrate that the charging circuit is a bridge circuit.

As discussed before, the electrodes 40, 41, 42' and 43 (FIGURE 5) may be charged by a charging pulse from the pulse generator 29. Such a charging pulse 67 is shown in FIGURE 9. One disadvantage of using a system such as shown in FIGURE 5 is that, in charging the electrode 42', a fraction of the charging pulse 67 appears across the load, causing the streamer origins to be displaced. To eliminate this problem, a pair of variable inductors 69 and 70 (FIGURE 10) may be provided for connecting the negative pole of generator 29 to the electrodes 41 and 42'. This connection results in a circuit that is equivalent to a bridge circuit during the period of the charging pulse. During this period, the electrodes may be regarded as having a capacity "C" between each pair. Schematically, the circuit of FIGURE 10 may be redrawn as the bridge circuit shown in FIGURE 11, wherein the capacity C between each pair of the electrodes add to form a capacitor having a value 2C in each of the upper branches of the bridge, while the terminating impedances 56 and 57, each having impedances $2Z_0$, and being in parallel, reduce to the impedance $Z_0$, connecting the midpoints of the bridge. For the purposes of the bridge, the electrodes 40, 41, 42' and 43 may be considered as points connecting the other elements of the bridge. As best understood with reference to FIGURE 11, the inductors 69 and 70 may be adjusted to have equal voltage drops during the charging pulse 67. The voltage at the point 40–41, therefore, may be adjusted to the equal to the voltage at the point 42' so that the voltage drop across the lumped impedance $Z_0$ is zero during the period of the charging pulse 67. Thus, by adjusting the impedances 69 and 70, occurrence of the charging pulse 67 across the load can be completely eliminated, thereby preventing any displacement of the streamer origins resulting therefrom. If desired, to balance streamer displacement for example, the inductors 69 and 70 may be adjusted to produce a pre-pulse of predetermined amplitude and either polarity.

To control the rate of charging of the transformer 32, an inductor 71 may be placed in series with the generator 29.

One embodiment exemplifying the invention included a streamer chamber having a useful interior region 2 meters long, 1½ meters wide, and two 30 cm. gaps. The high voltage pulse generator 29 was a 1.3 megavolt, 100 picofarad Marx generator. The target tube 24 was made of polyethylene terephthalate, and filled with hydrogen gas. The compartments of the streamer chamber were filled with a mixture of 90% neon and 10% helium gas. The characteristic impedance between each pair of streamer chamber plates was made to be 46 ohms. The terminating impedances 56 and 57 were each selected to be approximately 46 ohms. The charging electrode 43 of the transformer 32 was made to extend approximately 30 cm. from the spark gap switch 48 on each side of the central electrode 42'. The duration of the output pulse was made to be approximately 10 nanoseconds, with a rise time of about 4 nanoseconds and a fall time of about 5 nanoseconds and an amplitude of 600 kv. The charging pulse 67 had a duration of approximately 150 nanoseconds, with an amplitude of about 600 kv.

While an embodiment of the invention has been shown and described, further embodiments or combinations of those described herein will be apparent to those skilled in the art without departing from the spirit of the invention or from the scope of the appended claims.

We claim:
1. In a particle detection system, the combination of:
 a particle detection chamber;
 a high voltage pulse source;
 a pulse-shaping transmission-line transformer having an output connected to said chamber, said transformer including a normally open switch; and
 means operable in response to passage of a particle through said chamber for triggering said source to apply a pulse charge to said transformer, closure of said switch being effected upon charging of said transformer to a predetermined voltage, said switch closure initiating transfer of a portion of said pulse charge to said chamber, the duration of transfer of said pulse charge portion to said chamber being substantially shorter than the period of said application of said pulse charge to said transformer.

2. The combination of claim 1, wherein said chamber comprises first and second outer plates, a common plate mounted between said first and second plates, said first and second plates and said common plate being connected to said transformer output.

3. The combination of claim 2, wherein said chamber is further comprised of a first cell between said first plate and said common plate, a second cell between said common plate and said second plate, said first and second cells being filled with an ionizable gas, said cells being comprised of sides and walls of electrical insulation, said sides being parallel to said plates and separated therefrom.

4. The combination of claim 3, wherein said sides are transparent sheets, and said first and second plates and said common plate each have an opening opposite said cells, said plates further including a plurality of very fine wires stretched across each opening, the wires across each opening being electrically connected together to the respective plate.

5. The combination of claim 4, wherein said walls of said first and second cells are comprised of polyurethane foam.

6. The combination of claim 2, wherein said transformer is comprised of:
 first and second outer electrodes electrically connected, respectively, to said first and second plates of said chamber;
 a center electrode electrically connected to said common plate of said chamber;
 third and fourth charging electrodes symmetrically interposed between said first and second outer electrodes and said center electrode, said third and fourth electrodes being electrically insulated from said center electrode and said first and second outer electrodes; and within
 said switch is a spark gap having first and second poles, said first pole being connected to said first and second electrodes, and said second pole being connected to said third and fourth electrodes; and said pulse source is connected across said first and second poles.

7. The combination of claim 6, further including a first terminating impedance connected between said first plate and said common plate, and a second terminating impedance connected between said second plate and said common plate, said first terminating impedance having a value equal to the characteristic impedance of a cross section between said first plate and said common plate, said second terminating impedance having a value equal to the characteristic impedance of a cross section between said second plate and said common plate, said characteristic impedances being maintained constant over the lengths of the plates throughout the chamber and over the lengths of said first and second electrodes and said center electrode of said transformer.

8. The combination of claim 6, further including first and second voltage adjusting means having first and second ends, said first ends being connected together and to said pulse generator, the second end of said first adjusting means being connected to said center electrode, the second end of said second adjusting means being connected to said first and second electrodes.

9. The combination of claim 8, wherein said first and second voltage adjusting means are first and second variable inductors.

10. The combination of claim 6, wherein said charging electrodes are immersed in a liquid dielectric.

References Cited

UNITED STATES PATENTS

| | | | |
|---|---|---|---|
| 2,908,822 | 10/1959 | Cranberg | 250—83.3 |
| 2,929,932 | 3/1960 | Bouricius et al. | 250—83.1 |
| 3,254,220 | 5/1966 | Madey | 250—83.1 |

ARCHIE P. BORCHELT, *Primary Examiner.*

U.S. Cl. X.R.

250—83.1, 83.6